(12) United States Patent
Hsieh et al.

(10) Patent No.: US 10,985,585 B2
(45) Date of Patent: Apr. 20, 2021

(54) CHARGER MANAGEMENT METHOD, SERVER AND CHARGERS

(71) Applicant: KWANG YANG MOTOR CO., LTD., Kaohsiung (TW)

(72) Inventors: Ping-Jui Hsieh, Kaohsiung (TW); Chia-Cheng Tu, Kaohsiung (TW); Te-Chuan Liu, Taipei (TW); Jen-Chiun Lin, Taipei (TW); Yuh-Rey Chen, Taipei (TW); Po-Yu Chuang, Taipei (TW)

(73) Assignee: Kwang Yang Motor Co., Ltd.

( * ) Notice: Subject to any disclaimer, the term of this patent is extended or adjusted under 35 U.S.C. 154(b) by 251 days.

(21) Appl. No.: 16/284,463

(22) Filed: Feb. 25, 2019

(65) Prior Publication Data

US 2019/0280502 A1 Sep. 12, 2019

(30) Foreign Application Priority Data

Mar. 7, 2018 (TW) ................................. 107107600

(51) Int. Cl.
| | | |
|---|---|---|
| *H02J 7/00* | (2006.01) | |
| *H04L 29/08* | (2006.01) | |
| *B60L 53/60* | (2019.01) | |
| *B60L 53/65* | (2019.01) | |

(52) U.S. Cl.
CPC ............ *H02J 7/0047* (2013.01); *B60L 53/60* (2019.02); *B60L 53/65* (2019.02); *H04L 67/10* (2013.01)

(58) Field of Classification Search
CPC ...................................................... H02J 7/0047
USPC .......................................................... 320/107
See application file for complete search history.

(56) References Cited

U.S. PATENT DOCUMENTS

| | | | | |
|---|---|---|---|---|
| 5,606,242 | A * | 2/1997 | Hull .................... | H02J 7/00047 320/106 |
| 6,023,148 | A * | 2/2000 | Pignolet .................. | G06F 1/188 320/119 |
| 2009/0040102 | A1* | 2/2009 | Medina Herrero ..... | G01S 19/34 342/357.59 |
| 2011/0224509 | A1* | 9/2011 | Fish ........................ | G06F 21/32 600/301 |
| 2013/0201316 | A1* | 8/2013 | Binder .................... | H04L 67/12 348/77 |

\* cited by examiner

*Primary Examiner* — Yalkew Fantu
(74) *Attorney, Agent, or Firm* — Lewis Roca Rothgerber Christie LLP (57) ABSTRACT

A charger management method to be implemented by a server includes steps of: with respect to each charger, in response to receipt from the charger in a non-charging state of a notification including a charger identifier (ID) of the charger, updating the state flag of one of charger information sets stored in the server and including the charger ID to a second value; and in response to receipt of a query including a target location from a user end electronic device, selecting, based on the charger information sets and the target location, at least one candidate charging station information set from multiple charging station information sets.

14 Claims, 5 Drawing Sheets

CHARGER MANAGEMENT METHOD, SERVER AND CHARGERS

CROSS-REFERENCE TO RELATED APPLICATION

This application claims priority to Taiwanese Patent Application No. 107107600 filed on Mar. 7, 2018.

FIELD

The disclosure relates to a charger management method, and to a server and chargers for implementing the charger management method.

BACKGROUND

Due to the rise of environmental consciousness in recent years, governments in many countries provide subsidies for the development and purchase of electric vehicles (EVs). However, as of the present, charging stations for charging batteries of EVs are not as widespread as gas stations, so one may need to wait for a long time in order to charge the batteries.

SUMMARY

Therefore, an object of the present disclosure is to provide a charger management method, a server and chargers for users of EV to query and reserve available chargers in charging stations.

According to one aspect of the present disclosure, a charger management method to be implemented by a server is provided. The server is communicatively connected to a plurality of chargers and a user end electronic device via a communication network. Each of the chargers stores a unique charger identifier (ID) and is operable in one of a charging state and a non-charging state. The server stores a plurality of charger information sets and a plurality of charging station information sets. The charger information sets correspond respectively to the chargers, and each of the charger information sets includes the charger ID of the respective one of the chargers, and a state flag having one of a first value indicating that the respective one of the chargers is in the charging state and a second value different from the first value and indicating that the respective one of the chargers is in the non-charging state. The charging station information sets correspond respectively to a plurality of charging stations, and each of the charging station information sets is associated with at least one of the chargers and includes a geographical location of the respective one of the charging stations. The charger management method includes steps of:

with respect to each of the chargers, in response to receipt, from the charger when the charger is in the non-charging state, of a notification message including the charger ID of the charger, updating the state flag of one of the charger information sets that includes the charger ID included in the notification message to the second value;

in response to receipt of a query request including a target location from the user end electronic device, selecting, based on the charger information sets and the target location, at least one candidate charging station information set from the charging station information sets, each of the at least one candidate charging station information set including the geographical location that is within a predetermined distance from the target location and being associated with at least one of the chargers, the charger information set corresponding to which includes the state flag having the second value; and transmitting a response including the at least one candidate charging station information set to the user end electronic device.

According to another aspect of the present disclosure, a charger management method to be implemented by each of a plurality of chargers is provided. The chargers are communicatively connected to a server via a communication network. Each of the chargers stores a unique charger identifier (ID) and is operable in one of a charging state and a non-charging state. The server stores a plurality of charger information sets. The charger information sets correspond respectively to the chargers, and each of the charger information sets includes the charger ID of the respective one of the chargers, and a state flag having one of a first value indicating that the respective one of the chargers is in the charging state and a second value different from the first value and indicating that the respective one of the chargers is in the non-charging state. The charger management method includes steps of:

determining whether the charger is in the non-charging state;

when it is determined that the charger is in the non-charging state, transmitting a notification message including the charger ID of the charger to the server so that the server updates the state flag of one of the charger information sets that includes the charger ID included in the notification message to the second value, and starting to time a first time period; and when the first time period has elapsed, repeating the step of determining whether the charger is in the non-charging state.

According to still another aspect of the present disclosure, a server communicatively connected to a plurality of chargers and a user end electronic device via a communication network is provided. Each of the chargers stores a unique charger identifier (ID) and is operable in one of a charging state and a non-charging state. The server includes a storage module, a communication module and a processor module. The storage module stores a plurality of charger information sets and a plurality of charging station information sets. The charger information sets correspond respectively to the chargers, and each of the charger information sets includes the charger ID of the respective one of the chargers, and a state flag having one of a first value indicating that the respective one of the chargers is in the charging state and a second value different from the first value and indicating that the respective one of the chargers is in the non-charging state. The charging station information sets correspond respectively to a plurality of charging stations, and each of the charging station information sets is associated with at least one of the chargers and includes a geographical location of the respective one of the charging stations. The communication module is connected to the communication network. The processor module is electrically connected to the storage module and the communication module.

The processor module is configured to:

in response to receipt, from one of the chargers that is in the non-charging state, of a notification message including the charger ID of said one of the chargers, update the state flag of one of the charger information sets that includes the charger ID included in the notification message to the second value;

in response to receipt of a query request including a target location from the user end electronic device, select, based on the charger information sets and the target location, at least one candidate charging station information set from the charging station information sets, each of the at least one candidate charging station information set including the geographical location that is within a predetermined distance from the target location and being associated with at least one of the chargers, the charger information set corresponding to which includes the state flag having the second value; and transmit a response including the at least one candidate charging station information set to the user end electronic device.

According to yet another aspect of the present disclosure, a charger operable in one of a charging state and a non-charging state, and communicatively connected to a server and a user end electronic device via a communication network is provided. The server stores a charger information set that corresponds to the charger and that includes a unique charger identifier (ID) and a state flag having one of a first value indicating that the charger is in the charging state and a second value different from the first value and indicating that the charger is in the non-charging state. The charger includes a storage unit, a communication unit, a charging unit, and a processing unit. The storage unit stores the charger ID. The communication unit is connected to the communication network. The charging unit is for charging a battery and operable in one of the charging state, where the charging unit is electrically connected to the battery, and the non-charging state, where the charging unit is not electrically connected to the battery. The processing unit is electrically connected to the storage unit, the communication unit and the charging unit.

The processing unit is configured to periodically determine whether the charging unit is in the non-charging state. The processing unit is configured to, when the processing unit determines that the charging unit is in the non-charging state, generate and transmit a notification message including the charger ID to the server via the communication unit to enable the server to update the state flag value of the charger information set to the second value.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
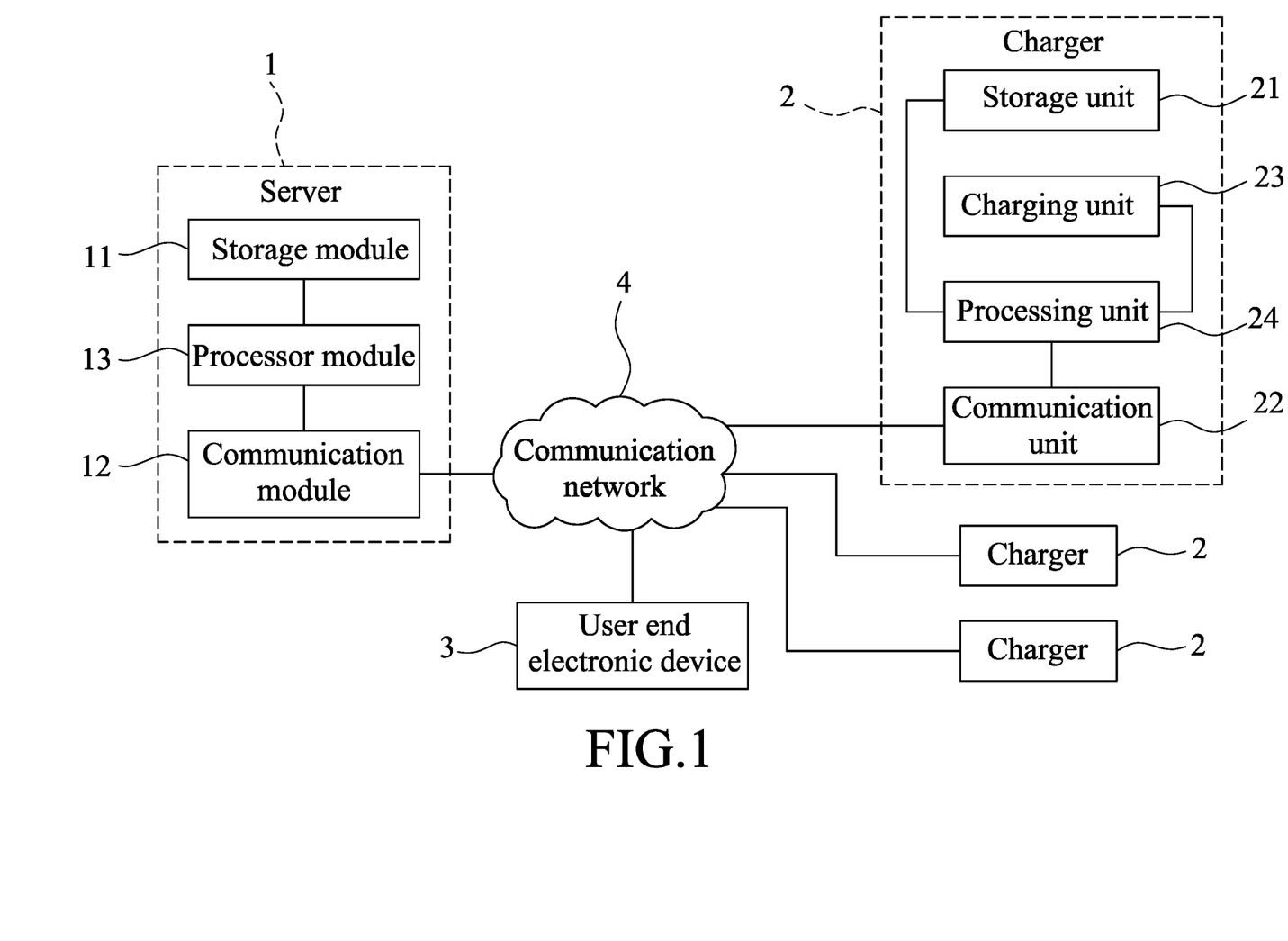
FIG. 1 is a block diagram of a server and chargers according to one embodiment of the present disclosure.

Referring to FIG. 1, a server 1 and a plurality of chargers 2 according to one embodiment of the present disclosure are shown. The server 1 is communicatively connected to the chargers 2 and a user end electronic device 3 via a communication network 4. The server 1 includes a storage module 11, a communication module 12, and a processor module 13 electrically connected to the storage module 11 and the communication module 12. Each charger 2 stores a unique charger identifier (ID) thereof, and is operable in one of a charging state and a non-charging state.

The storage module 11 of the server 1 stores a plurality of charger information sets, a plurality of charging station information sets and a plurality of reservation information sets. The charger information sets correspond respectively to the chargers 2. Each of the charger information sets includes the charger ID of the respective one of the chargers 2, and a state flag having one of a first value indicating that the respective one of the chargers 2 is in the charging state, a second value different from the first value and indicating that the respective one of the chargers 2 is in the non-charging state and is not reserved, and a third value different from the first value and the second value and indicating that the respective one of the chargers 2 is in the non-charging state and is reserved.

The charging station information sets correspond respectively to a plurality of charging stations. Each of the charging station information sets is associated with at least one of the chargers 2, and includes a geographical location, a telephone number and a name of the respective one of the charging stations. In this embodiment, each of the charging station information sets is associated with a plurality of chargers 2 located at the respective one of the charging stations. Each of the reservation information sets includes a reserving user data related to a reserving user who has reserved one of the chargers 2 for charging a battery, a reserved time for the reserving user, and the charger ID of the reserved one of the chargers 2. Note that each charging station is a charging station with attendants to attend to services such as plugging a charger into an electric vehicle, etc., in this embodiment and may be a self-service charging station in other embodiments, but the present disclosure is not limited in this respect.

Each charger 2 includes a storage unit 21, a communication unit 22 connected to the communication network 4, a charging unit 23 and a processing unit 24. The storage unit 21 of each of the chargers 2 stores the charger ID of the charger 2. The charging unit 23 of each charger 2 is for charging a battery (not shown) and is operable in one of the charging state, where the charging unit 23 is electrically connected to a battery (not shown) and forms a closed circuit with the battery, and the non-charging state, where the charging unit 23 is not electrically connected to any battery and forms an open circuit. The processing unit 24 of each charger 2 is electrically connected to the storage unit 21, the communication unit 22 and the charging unit 23.

The user end electronic device 3 is, for example, a mobile phone (e.g., a smartphone) in this embodiment, and can be, for example, a personal digital assistant (PDA), a tablet computer or a smart watch in other embodiments of the present disclosure. The communication network 4 is, for example, the Internet.

Note that each of the terms "storage unit" and "storage module", or the like throughout the specification may refer to or include any non-transitory memory mechanism, such as read-only memory (ROM), non-transitory random-access memory (NVRAM), magnetic disk storage medium, optical storage medium, flash memory, solid state devices (SSD), or other storage devices and media. Each of the terms "processor module" and "processing unit" and the like throughout the specification may refer to any device or portion of a device that processes electronic data from registers and/or memory to transform that electronic data into other electronic data. For example, each of the processor module 13 and the processing unit 24 may refer to or include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

Figure 2:
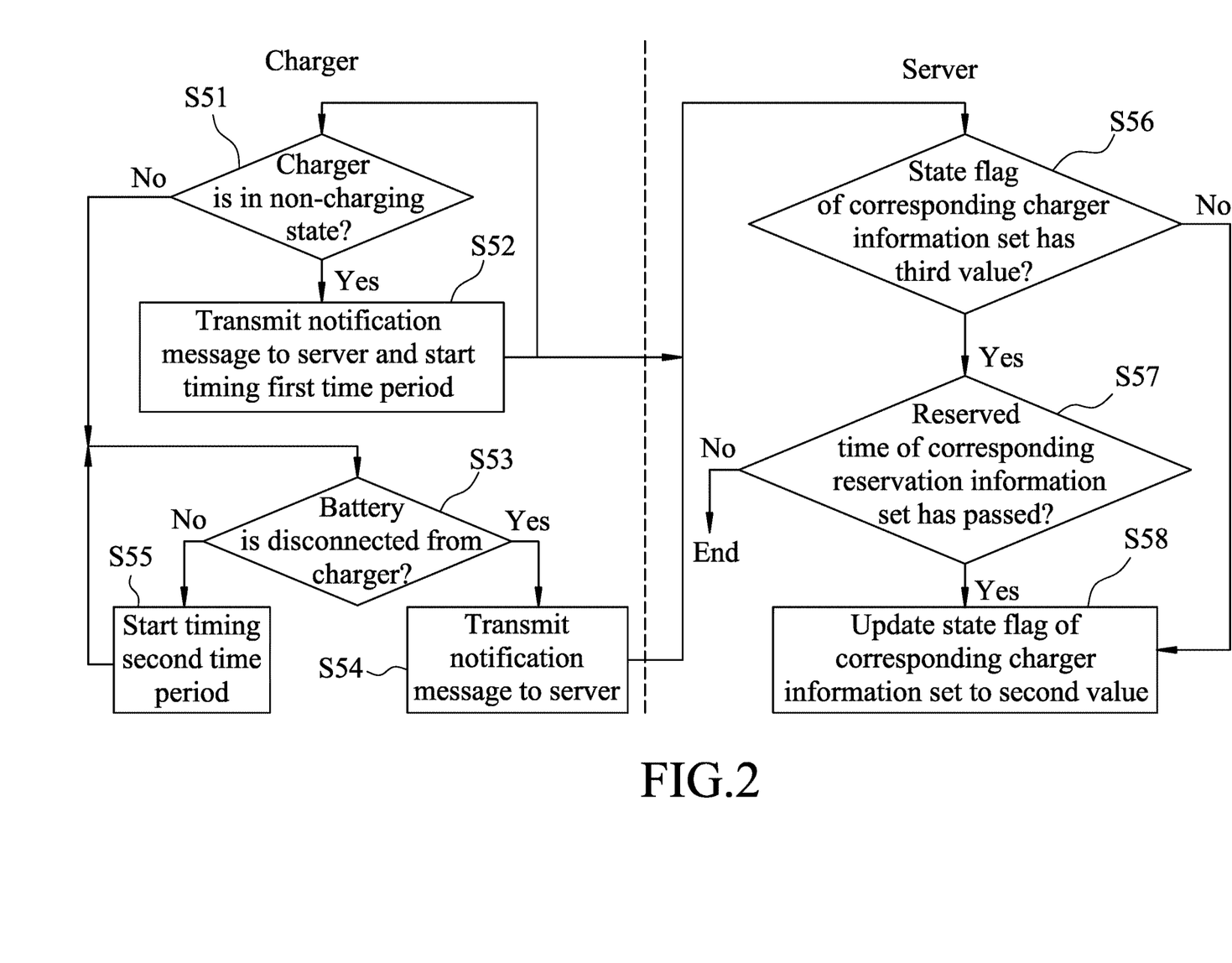
FIGS. 2 and 3 are flow charts illustrating an updating procedure of a charger management method according to one embodiment of the present disclosure.
Figure 3:
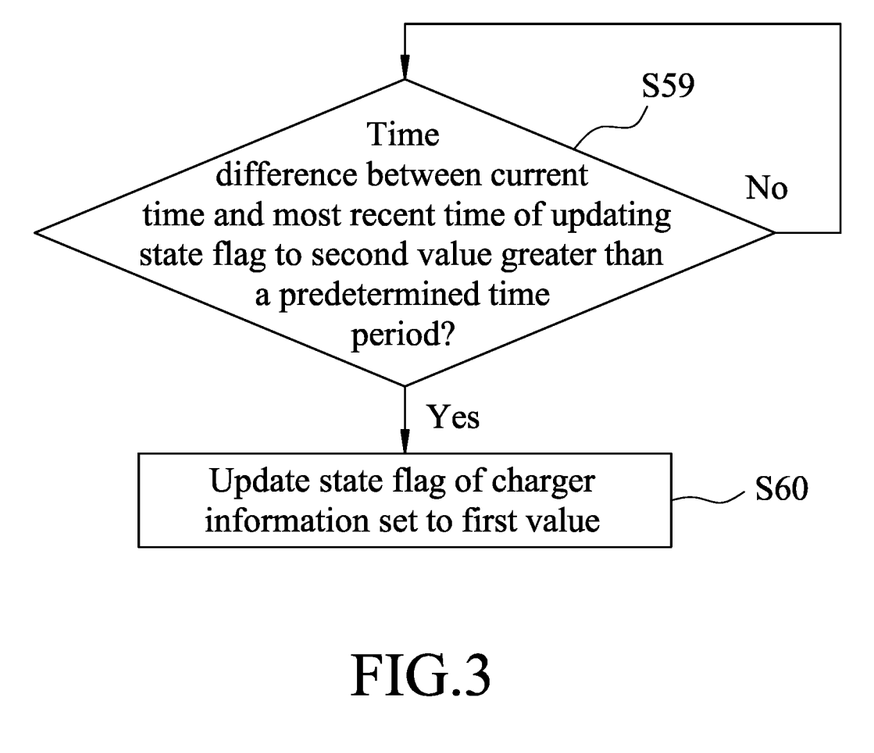
Figure 4:
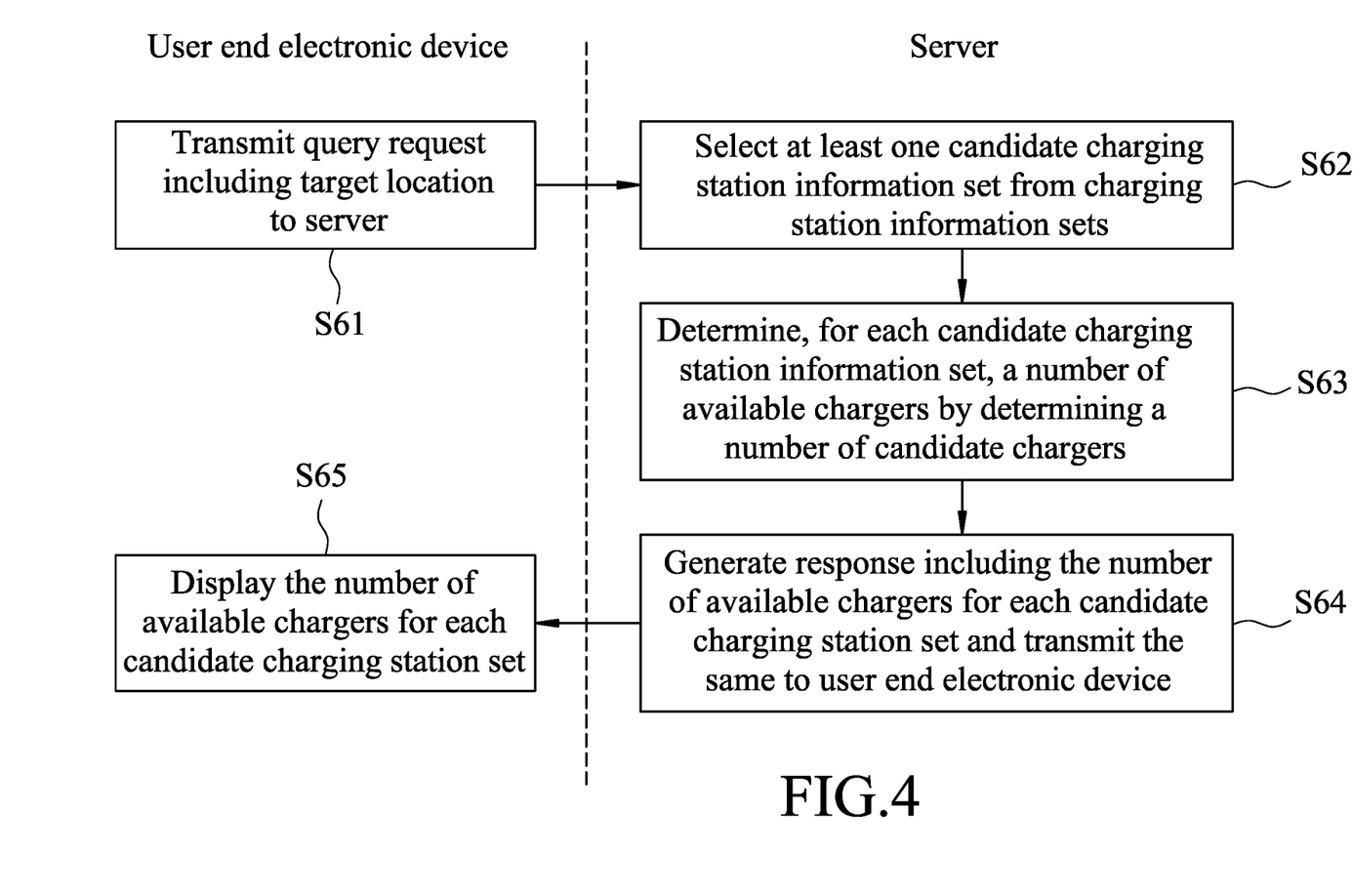
FIG. 4 is a flow chart illustrating a query procedure of the charger management method according to one embodiment of the present disclosure.
Figure 5:
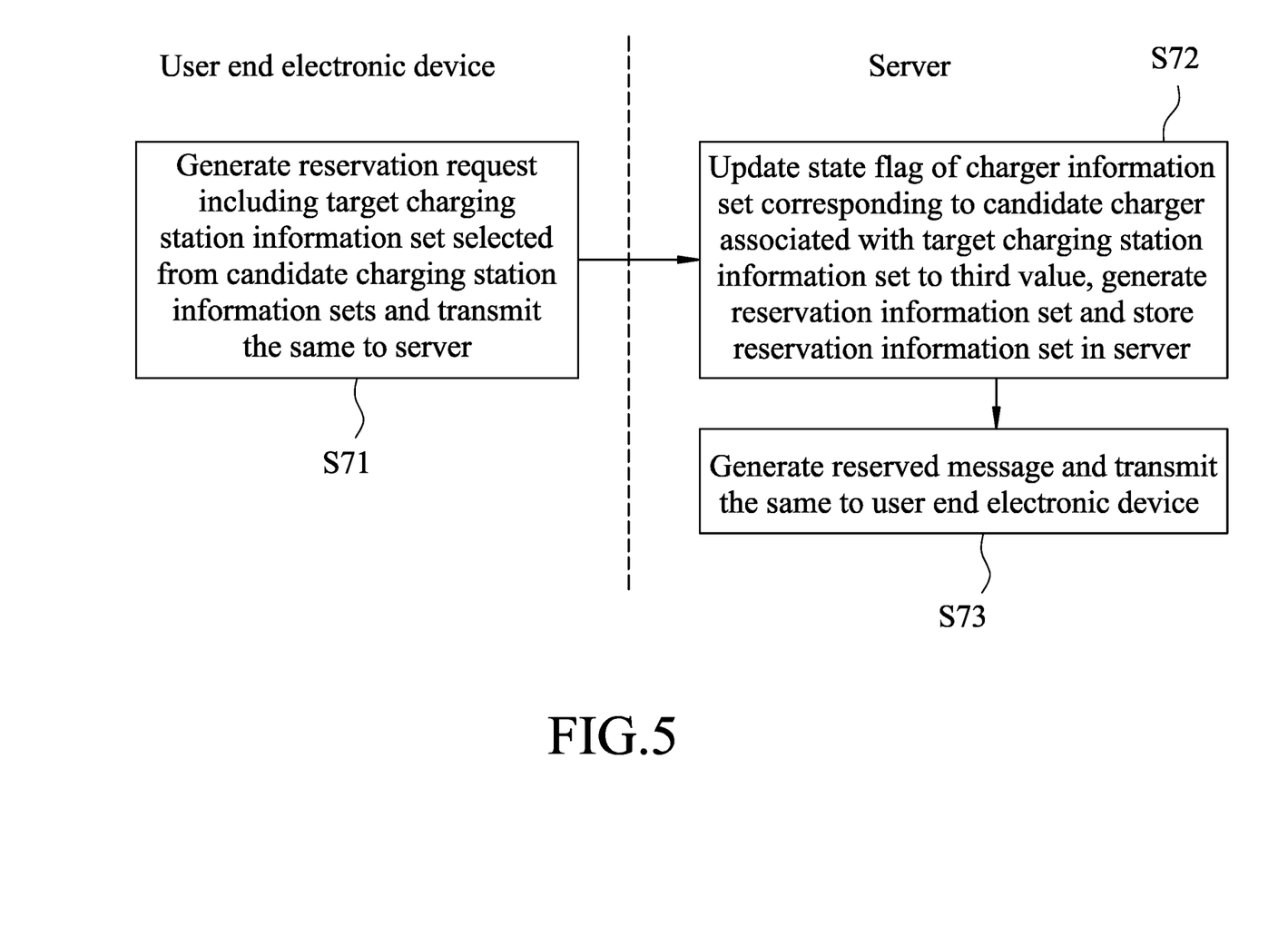
FIG. 5 is a flow chart illustrating a reservation procedure of the charger management method according to one embodiment of the present disclosure.

As shown FIGS. 2 to 5, a charger management method to be implemented by the server 1, the chargers 2, and the user end electronic device 3 is provided. The charger management method includes an updating procedure (FIGS. 2 and 3), a query procedure (FIG. 4) and a reservation procedure (FIG. 5). Referring to FIGS. 2 and 3, the updating procedure is implemented by the server 1 and each charger 2 for updating the state flag of the charger information set corresponding to the charger 2 as stored in the server 1 to indicate a current state of the charger 2, and includes steps S51 to S60. Specifically, FIG. 2 relates to steps for updating the state flag of the charger information set to the second value, and FIG. 3 relates to steps for updating the state flag of the charger information set to the first value. It should be noted that the updating procedure is described in the following with respect to only one of the chargers 2, and the same updating procedure can be applied with respect to all the chargers 2, individually.

In step S51, the processing unit 24 determines whether the charging unit 23 is in the non-charging state. When it is determined that the charging unit 23 is in the non-charging state, the flow of the updating procedure goes to step S52. When the processing unit determines that the charging unit 23 is in the charging state, the flow of the updating procedure goes to step S53. In step S52, the processing unit 24 transmits a notification message including the charger ID of the charger 2 to the server 1 and starts timing of a first time period. After the first time period has elapsed, the flow of the updating procedure goes back to step S51. In this embodiment, the first time period is for example five seconds but the present disclosure is not limited to this example.

In step S53, the processing unit 24 determines whether a battery has been disconnected from the charging unit 23. When affirmative, the flow of the updating procedure goes to step S54; otherwise, the flow of the updating procedure goes to step S55. In this embodiment, when the charging unit 23 is in the charging state, the processing unit 24 attempts to read battery data from the battery that is electrically connected to the charging unit 23 of the charger 2, and determines that the battery has been disconnected from the charging unit 23 when the processing unit 24 cannot obtain the battery data.

In step S54, the processing unit 24 transmits the notification message including the charger ID of the charger 2 to the server 1.

In step S55, the processing unit 24 starts timing of a second time period. After the second time period has elapsed, the flow of the updating procedure goes back to step S53. That is to say, the processing unit 24 repeatedly determines whether the battery has been disconnected at intervals having a length of the second time period. In this embodiment, the second time period is shorter than the first time period and is for example three seconds, but the present disclosure is not limited to this example.

It should be noted that in other embodiments of this disclosure, when it is determined in step S51 that the charging unit 23 is in the charging state, the flow of the updating procedure goes to an alternative step of starting to time, by the processing unit 24, the first time period without implementing steps S53 to S55. After the alternative step (i.e., the first time period has elapsed), the flow of the updating procedure goes back to step S51. That is, the processing unit 24 repeatedly determines whether the charging unit 23 is in the non-charging state at intervals having a length of the first time period.

Note that when it is determined that the charging unit 23 is in the charging state, as compared to the flow of the updating procedure going to the alternative step that goes back to step S51 to determine the state of the charging unit 23 every five seconds (the first time period), the flow of the updating procedure going to step S53 that goes back to step S51 to determine the state of the charging unit 23 every three seconds (the second time period) has a higher updating frequency for updating the state flag of the charger information set.

Additionally, in this embodiment, step S53 or the alternative step is performed only if the determination made in step S51 is negative (i.e., the charging unit 23 is in the charging state). In other embodiments, step S53 (or the alternative step) and step S51 may be performed in parallel but the present disclosure is not limited in this respect.

After the notification message is sent in step S52 or S54, step S56 is performed. In step S56, the processor module 13 receives the notification message including the charger ID of the charger 2, and determines whether the state flag of the charger information set that includes the charger ID included in the notification message has the third value. When the processor module 13 determines that the state flag has the third value, the flow of the updating procedure goes to step S57. Otherwise, the flow of the updating procedure goes to step S58.

In step S57, the processor module 13 determines whether the reserved time of the reservation information set corresponding to the charger ID in the notification message has passed. When the processor module 13 determines that the reserved time has passed, the flow of the updating procedure goes to step S58; otherwise, the updating procedure terminates.

In step S58, the processor module 13 updates the state flag of the charger information set including the charger ID included in the notification message to the second value.

For updating the state flag of the charger information set to the first value, step S59 is performed. In step S59, the processor module 13 determines whether a time difference between a current time and a most recent time of updating the state flag to the second value (the time step S58 is performed last) is greater than a predetermined time period. In some embodiments, step S59 is to determine whether no notification message is received by the processor module 13 from the charger 2 for the predetermined time period after updating the state flag to the second value (the time step S58 is performed). When affirmative (i.e., when, after the state flag is updated to the second value, the predetermined time period has elapsed, or no notification message is received for the predetermined time period), the flow of the updating procedure goes to step S60; otherwise, step S59 is repeated.

In step S60, the processor module 13 updates the state flag of the charger information set including the charger ID of the charger 2 to the first value. In this embodiment, the predetermined time period is greater than the first time period and is greater than the second time period, and is for example seven seconds.

Now referring to FIGS. 1 and 4, the query procedure of the charger management method to be implemented by the server 1 and the user end electronic device 3 is shown and includes steps S61 to S65. In step S61, the user end electronic device 3 transmits, via the communication network 4, a query request including a target location to the processor module 13 of the server 1. The user end electronic device 3 generates the query request, for example, when a user of the user end electronic device 3 selects a position on a map displayed on a screen of the user end electronic device 3, and the selected position serves as the target location to be transmitted to the processor module 13. The target location is, for example, a current geographic location of the user end electronic device 3 or can be designated to any location as desired by the user.

In step S62, in response to receipt of the query request including the target location from the user end electronic device 3, the processor module 13 selects, based on the charger information sets and the target location, at least one candidate charging station information set from the charging station information sets. Each candidate charging station information set includes the geographical location that is within a predetermined distance from the target location, and is associated with at least one charger 2 (to be referred to as candidate charger 2 hereinafter) which is located at the geographical location and the charger information set corresponding to which includes the state flag having the second value. In step S63, the processor module 13 determines, for each candidate charging station information set, a number of available chargers by determining a number of the candidate charger(s) 2.

In step S64, the processor module 13 generates a query response including the number of available chargers for each candidate charging station set, and transmits the query response to the user end electronic device 3 via the communication module 12.

In step S65, upon receipt of the query response from the processor module 13, the user end electronic device 3 displays the number of available chargers for each candidate charging station set. In one embodiment, the user end electronic device 3 displays, on a screen thereof, a map marked with the geographical location of each candidate charging station information set and the number of available chargers for each candidate charging station information set.

Referring to FIGS. 1 and 5, the reservation procedure of the charger management method according to one embodiment of the present disclosure is shown. The reservation procedure is implemented by the server 1 and the user end electronic device 3, and includes steps S71 to S73. In step S71, the user end electronic device 3 generates a reservation request including a target charging station information set selected from the candidate charging station information set(s) obtained in the query procedure (FIG. 4), and transmits the reservation request over the communication network 4 to the processor module 13 via the communication module 12.

In step S72, the processor module 13 updates the state flag of the charger information set corresponding to one of the candidate charger(s) 2 associated with the charging station (to be referred to as target charging station hereinafter) that corresponds to the target charging station information set to the third value, generates a reservation information set, and stores the reservation information set in the storage module 11. The reservation information set includes reserving user data related to a user who intends to reserve a charger 2, a reserved time for the reserving user, and the charger ID of one of the candidate chargers (which is referred to as a reserved charger) associated with the target charging station information set. It should be noted that when the number of available chargers at the target charging station is greater than one, the processor module 13 may update the charger information set corresponding to any one of the candidate chargers 2, and designate said one of the candidate chargers as the reserved charger for the reserving user.

In this embodiment, the reserved time is obtained by adding a preset time period of, for example, fifteen minutes, to a time of receipt of the reservation request. It should be noted that, in the updating procedure, in step S57, the processor module 13 is essentially determining whether a time difference between a current time and the time of receipt of the reservation request is greater than the preset time period. When affirmative, the processor module 13 updates the state flag of the charger information set that includes the charger ID of the reserved charger 2 (having the charger ID of one of the candidate chargers 2 associated with the target charging station information set) to the second value. That is to say, the reserved charger 2 is held for the user for the preset time period, e.g. fifteen minutes.

In step S73, the processor module 13 generates a reservation message and transmits the same via the communication module 12 to the user end electronic device 3.

To sum up, by virtue of the charger management method of the present disclosure, each charger 2 transmits, to the server 1, a notification message including the charger ID thereof when in the non-charging state, such that the server 1 updates the state flag of the charger information set that includes the charger ID included in the notification message to the second value when determining that the charger 2 is not reserved or the reserved time has passed. When the server 1 has not received any notification message from the charger 2 for the predetermined time period, the server 1 updates the state flag of the charger information set including the corresponding charger ID of the charger 2 to the first value. In response to receipt of the query request, the server 1 selects at least one candidate charging station information set from the charging station information sets based on the charger information sets and the target location, and transmits the query response including the number of available (candidate) chargers 2 for each candidate charging station set to the user end electronic device 3. Additionally, after receipt of the query response by the user end electronic device 3, the user can then transmit the reservation request via the user end electronic device 3 for booking one of the candidate chargers 2 included in the query response. In this way, information regarding the number of available chargers 2 for each candidate charging station set is provided to the user of the user end electronic device 3 and thus a relatively high usage rate for the charging stations can be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A charger management method to be implemented by a server, the server communicatively connected to a plurality of chargers and a user end electronic device via a communication network, each of the chargers storing a unique charger identifier (ID) and being operable in one of a charging state and a non-charging state, the server storing a plurality of charger information sets and a plurality of charging station information sets, the charger information sets corresponding respectively to the chargers, each of the charger information sets including the charger ID of the respective one of the chargers, and a state flag having one of a first value indicating that the respective one of the chargers is in the charging state and a second value different from the first value and indicating that the respective one of the chargers is in the non-charging state, the charging station information sets corresponding respectively to a plurality of charging stations, each of the charging station information sets being associated with at least one of the chargers and including a geographical location of the respective one of the charging stations, the charger management method comprising steps of:

with respect to each of the chargers, in response to receipt, from the charger when the charger is in the including the charger ID of the charger, updating the state flag of one of the charger information sets that includes the charger ID included in the notification message to the second value;

in response to receipt of a query request including a target location from the user end electronic device, selecting, based on the charger information sets and the target location, at least one candidate charging station information set from the charging station information sets, each of the at least one candidate charging station information set including the geographical location that is within a predetermined distance from the target location and being associated with at least one of the chargers, the charger information set corresponding to which includes the state flag having the second value; and transmitting a response including the at least one candidate charging station information set to the user end electronic device.

2. The charger management method as claimed in claim 1, further comprising, prior to the step of transmitting a response to the user end electronic device, a step of determining, for each of the at least one candidate charging station information set, a number of available chargers by determining a number of the at least one of the chargers which is associated with the candidate charging station information set and the charger information set corresponding to which includes the state flag having the second value, wherein the step of transmitting a response to the user end electronic device includes transmitting the response further including the number of available chargers.

3. The charger management method as claimed in claim 1, further comprising a step of:

with respect to each of the chargers, when not receiving any notification message from the charger for a predetermined time period, updating the state flag of the corresponding one of the charger information sets to the first value.

4. The charger management method as claimed in claim 1, the second value further indicating that the charger is not reserved, the state flag being one of the first value, the second value and a third value different from the first and second values and indicating that the charger is in the non-charging state and is reserved, wherein the charger management method further comprises, after the step of transmitting a response to the user end electronic device, a step of in response to receipt from the user end electronic device of a reservation request including a target charging station information set selected from the at least one candidate charging station information set, updating the state flag that is included in one of the charger information sets corresponding to one of the at least one of the chargers associated with the target charging station information set and that has the second value to the third value.

5. The charger management method as claimed in claim 4, wherein the step of updating the state flag of one of the charger information sets that includes the charger ID included in the notification message to the second value includes:

in response to receipt of the notification message including the charger ID, determining whether the state flag of the charger information set that includes the charger ID included in the notification message has the third value;

when it is determined that the state flag does not have the third value, updating the state flag to the second value;

when it is determined that the state flag has the third value, determining whether a time difference between a current time and a time of receipt of the reservation request is greater than a preset time period; and when it is determined that the time difference is greater than the preset time period, updating the state flag to the second value.

6. A charger management method to be implemented by each of a plurality of chargers communicatively connected to a server via a communication network, each of the chargers storing a unique charger identifier (ID) and being operable in one of a charging state and a non-charging state, the server storing a plurality of charger information sets, the charger information sets corresponding respectively to the chargers, each of the charger information sets including the charger ID of the respective one of the chargers, and a state flag having one of a first value indicating that the respective one of the chargers is in the charging state and a second value different from the first value and indicating that the respective one of the chargers is in the non-charging state, the charger management method comprising steps of:

determining whether the charger is in the non-charging state;

when it is determined that the charger is in the non-charging state, transmitting a notification message including the charger ID of the charger to the server so that the server updates the state flag of one of the charger information sets that includes the charger ID included in the notification message to the second value, and starting to time a time period; and when the time period has elapsed, repeating the step of determining whether the charger is in the non-charging state.

7. The charger management method as claimed in claim 6, further comprising a step of:

in response to a battery being disconnected from the charger, transmitting the notification message to the server so that the server updates the state flag of one of the charger information sets that includes the charger ID included in the notification message to the second value.

8. A server communicatively connected to a plurality of chargers and a user end electronic device via a communication network, each of the chargers storing a unique charger identifier (ID) and being operable in one of a charging state and a non-charging state, said server comprising:

a storage module storing a plurality of charger information sets and a plurality of charging station information sets, the charger information sets corresponding respectively to the chargers, each of the charger information sets including the charger ID of the respective one of the chargers, and a state flag having one of a first value indicating that the respective one of the chargers is in the charging state and a second value different from the first value and indicating that the respective one of the chargers is in the non-charging state, the charging station information sets corresponding respectively to a plurality of charging stations, each of the charging station information sets being associated with at least one of the chargers and including a geographical location of the respective one of the charging stations;

a communication module connected to the communication network; and a processor module electrically connected to said storage module and said communication module, wherein said processor module is configured to in response to receipt, from one of the chargers that is in the non-charging state, of a notification message including the charger ID of said one of the chargers, update the state flag of one of the charger information sets that includes the charger ID included in the notification message to the second value, in response to receipt of a query request including a target location from the user end electronic device, select, based on the charger information sets and the target location, at least one candidate charging station information set from the charging station information sets, each of the at least one candidate charging station information set including the geographical location that is within a predetermined distance from the target location and being associated with at least one of the chargers, the charger information set corresponding which includes the state flag having the second value, and transmit a response including the at least one candidate charging station information set to the user end electronic device.

9. The server as claimed in claim 8, wherein said processor module is configured to determine, for each of the at least one candidate charging station information set, a number of available chargers by determining a number of the at least one of the chargers which is associated with the candidate charging station information set and the charger information set corresponding to which includes the state flag having the second value; and transmit the response further including the number of available chargers to the user end electronic device.

10. The server as claimed in claim 8, wherein said processor module is further configured to, with respect to each of the chargers, when not receiving any notification message from the charger for a predetermined time period, update the state flag of the corresponding one of the charger information sets to the first value.

11. The server as claimed in claim 8, wherein the second value further indicates that the charger is not reserved, the state flag being one of the first value, the second value and a third value different from the first and second values and indicating that the charger is in the non-charging state and is reserved, wherein said processor module is further configured to, in response to receipt from the user end electronic device via said communication module of a reservation request including a target charging station information set selected from the at least one candidate charging station information set, update the state flag that is included in one of the charger information sets corresponding to one of the at least one of the chargers associated with the target charging station information set and that has the second value to the third value.

12. The server as claimed in claim 11, wherein said processor module is further configured to:

in response to receipt of the notification message including the charger ID, determine whether the state flag of one of the charger information sets that includes the charger ID included in the notification message has the third value;

when said processor module determines that the state flag does not have the third value, update the state flag to the second value;

when said processor module determines that the state flag has the third value, determine whether a time difference between a current time and a time of receipt of the reservation request is greater than a preset time period; and when said processor module determines that the time difference is greater than the preset time period, update the state flag to the second value.

13. A charger operable in one of a charging state and a non-charging state, and communicatively connected to a server and a user end electronic device via a communication network, the server storing a charger information set that corresponds to said charger and that includes a unique charger identifier (ID) and a state flag having one of a first value indicating that said charger is in the charging state and a second value different from the first value and indicating that said charger is in the non-charging state, said charger comprising:

a storage unit storing the charger ID;

a communication unit connected to the communication network;

a charging unit for charging a battery and operable in one of the charging state, where said charging unit is electrically connected to the battery, and the non-charging state, where said charging unit is not electrically connected to any battery; and a processing unit electrically connected to said storage unit, said communication unit and said charging unit;

wherein said processing unit is configured to periodically determine whether said charging unit is in the non-charging state, and to, when said processing unit determines that said charging unit is in the non-charging state, generate and transmit a notification message including the charger ID to the server via said communication unit so as to enable the server to update the state flag value of the charger information set to the second value.

14. The charger as claimed in claim 13, wherein when the battery is disconnected from said charging unit, said processing unit is configured to transmit the notification message to the server via said communication unit so as to enable the server to update the state flag of the charger information set to the second value.

\* \* \* \* \*

UNITED STATES PATENT AND TRADEMARK OFFICE
CERTIFICATE OF CORRECTION

PATENT NO. : 10,985,585 B2
APPLICATION NO. : 16/284463
DATED : April 20, 2021
INVENTOR(S) : Ping-Jui Hsieh et al.

It is certified that error appears in the above-identified patent and that said Letters Patent is hereby corrected as shown below:

On the Title Page

Item (73) Assignee      After "Ltd.",
Insert -- (TW) --

In the Claims

Column 9, Line 39, Claim 1      After "charger is in the",
Insert -- non charging state, of a notification message --

Signed and Sealed this
Twenty-sixth Day of April, 2022

*Katherine Kelly Vidal*

Katherine Kelly Vidal
*Director of the United States Patent and Trademark Office*